United States Patent
Blackstein et al.

(10) Patent No.: US 10,243,992 B2
(45) Date of Patent: Mar. 26, 2019

(54) SECURE CONTENT DELIVERY OVER A DOMAIN PORTAL

(71) Applicant: Facebook, Inc., Menlo Park, CA (US)

(72) Inventors: Simon A. Blackstein, San Francisco, CA (US); Oren Hafif, London (GB); Itay Duvdevani, HaAyin (IL); Erling Alf Ellingsen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 192 days.

(21) Appl. No.: 15/425,974

(22) Filed: Feb. 6, 2017

(65) Prior Publication Data

US 2018/0227327 A1    Aug. 9, 2018

(51) Int. Cl.
    *H04L 29/06* (2006.01)
(52) U.S. Cl.
    CPC ........ *H04L 63/1483* (2013.01); *H04L 63/123* (2013.01)
(58) Field of Classification Search
    CPC ................... H04L 63/1483; H04L 63/123
    See application file for complete search history.

(56) References Cited

U.S. PATENT DOCUMENTS

| | | |
|---|---|---|
| 8,978,159 B1 | 3/2015 | van Dijk |
| 9,514,446 B1 | 12/2016 | Rajkumar |
| 2002/0169953 A1 | 11/2002 | Moharram |
| 2003/0097564 A1 | 5/2003 | Tewari |
| 2009/0165124 A1 | 6/2009 | Spektor |
| 2009/0187918 A1* | 7/2009 | Chen ................ G06F 21/52 719/313 |
| 2011/0214187 A1* | 9/2011 | Wittenstein ......... H04L 63/1425 726/25 |
| 2011/0283110 A1 | 11/2011 | Dapkus |
| 2011/0302653 A1* | 12/2011 | Frantz ................ G06F 21/552 726/22 |

(Continued)

OTHER PUBLICATIONS

International Search Report and Written Opinion for PCT Application No. PCT/US2017/020313, dated Nov. 29, 2017.

(Continued)

*Primary Examiner* — Robert B Leung
*Assistant Examiner* — Thomas Ho
(74) *Attorney, Agent, or Firm* — Baker Botts L.L.P.

(57) ABSTRACT

In one embodiment, a method includes sending a login request to a server computing device; receiving a first derivative identifier from the server computing device; storing the first derivative identifier; sending a content request to the server computing device for a web page; receiving, from the server computing device, a content frame and a trusted frame for display on the client device, wherein the content frame comprises a second derivative identifier; according to instructions associated with the content frame, requesting the trusted frame to verify whether the second derivative identifier matches the first derivative identifier; according to instructions associated with the trusted frame, verifying whether the second derivative identifier matches the stored first derivative identifier; and displaying the requested web page in the content frame based on a verification confirmation from the trusted frame that the second derivative identifier matches the stored first derivative identifier.

20 Claims, 4 Drawing Sheets

(56) References Cited

U.S. PATENT DOCUMENTS

2013/0263263 A1* 10/2013 Narkolayev ............ G06F 21/51
726/22
2014/0208122 A1    7/2014 Mathur
2016/0094575 A1*  3/2016 Shekyan ............. H04L 63/1433
726/25

OTHER PUBLICATIONS

EESR received from EPO for EP Patent Application No. 17184723.9-1213, Feb. 1, 2018.

* cited by examiner

SECURE CONTENT DELIVERY OVER A DOMAIN PORTAL

TECHNICAL FIELD

This disclosure generally relates to Internet security.

BACKGROUND

An online application, such as a website, may enable people to access the Internet in locations where Internet access via a data plan may be unaffordable. The online application may act like a portal that allows third-party content and service providers to provide content and services to people who otherwise would not be able to access their websites. Any content provided through the online application, including third-party website content, are provided under the domain of the online application.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

An online application may allow third-party content and service providers to provide content and services to people who otherwise would not be able to access their websites. These third-party entities may have websites with web addresses that may be treated as subdomains within the domain of the online application. For example, if a website's normal web address is http://www.domainA.com, and the online application aggregates websites under a main domain referred to as xyz.com, the web address of the third-party website displayed through the online application may be presented as https://inner-http-www-domainA-com.xyz-.com. The web address or host of the third-party website may be used to generate a subdomain of the domain of the online application. In this way, the online application may act as a "portal" to other websites and online services. These websites and online services may be available for free (e.g., without data charges), and include content on subject matter like news, employment, health, education, and local information. As an example and not by way of limitation, the domain of the online application may be xyz.com. In particular embodiments, third-party content provided through the online application may be provided under the domain of the online application (e.g., xyz.com). For example, when accessing a third-party website such as HTTP://WWW.G-MAIL.COM through the online application, the URL representing the third-party website may be HTTPS://inner-http-www-gmail-com.xyz.com. The subdomain in this example is "inner-http-www-gmail-com," which is derived from GMAIL's actual address.

When a user visits a website via the online application, the online application may automatically create an identifier for that user. The identifier may be understood to be a userID, an encryption key, or both of these. The identifier may be unique for each user, and may be stored in a cookie on the user's client device (e.g., in a browser on the client device). A client device may be any suitable computing device such as a smartphone, desktop or laptop computer, tablet, wearable device (e.g., smartwatch), or virtual reality headset. The stored cookie may be used in communications between the user device and the online application to identify a session. In particular embodiments, information within the cookie may be associated with a cookie jar on a server of the online application. As the user browses various third-party websites through the online application, associated cookies may be stored in the user's cookie jar on the server.

One security risk with the online application described above is that a hacker may alter the userID and gain access to the user's browsing activities. In particular embodiments, the online application may not be in the public-suffix list. Thus, it may not be able to provide adequate separation between subdomains. Because a third-party page that a user visits through the online application may be presented under the main domain of the online application (e.g., xyz.com), a malicious third-party page may potentially be able to change any cookie associated with the domain of the online application, including cookies associated with subdomains of the domain. This problem does not typically exist because a client browser generally only allows webpages to change cookies that are associated with the domain of that webpage, which means a malicious third-party web page may only change the cookies associated with its own domain. As an example and not by way of limitation, a malicious web page hosted on malicious.com may be able to set and change cookies that are associated with malicious.com, but not cookies for any other domain. But if the user is accessing malicious.com through the online application xyz.com, the URL for the malicious web page may appear as HTTPS://inner-http-www-malicious-com.xyz.com. In this scenario, a client browser may allow a webpage hosted on malicoius.com, which now belongs to a subdomain of xyz.com, to perform domain lowering and gain control of domain-level cookies. This may be achieved through a JavaScript code block or by any other suitable mechanism. This is because browsers generally allow domain administrators to change subdomains to less-specific versions of the current domain. Because xyz.com is a less-specific version of malicious-com.xyz.com, a browser may allow such a change to occur. Thus, it is conceivable that an attacker, through client-side scripting hosted on malicious.com, may replace the user's userID in the stored cookie with the attacker's own ID, which may have been obtained from xyz.com as well. The attacker's ID may then be unknowingly used by the user in subsequent communications with the online application, which means that the user's browsing activities may be accessible to the attacker. For example, if the user, subsequent to being hacked, visits domainB.com through the online application, any cookie associated with that communication may be stored in the cookie jar associated with the attacker's ID. Thus, the attacker may use his own ID to communicate with the online application and use the cookies stored in the cookie jar, including the user's cookie for domainB.com, and view any private information that the user may access on domainB-com.xyz.com. For example, if domainB-com.xyz.com contains the user's email account, the attacker may be able to view messages in the account. This may put many users at risk.

To protect users from attackers, when a user initially uses the online application to access third-party content, in particular embodiments, a client device may send a login request to a server computing device associated with the online application. In response to the request, the online application may generate a first identifier and a first derivative identifier. In particular embodiments, the first derivative identifier may be generated by applying a function to the first identifier. In particular embodiments, the online application may associate the user with the first identifier and the first derivative identifier. In particular embodiments, the online application may send the first identifier and the first derivative identifier to the client device of the user for storage. In particular embodiments, the client device may store the first derivative identifier in local storage. The first identifier may be stored as a cookie. When the user sends a content request to the online application (which may or may not be at the time of initial login), in particular embodiments, the user's client device may send, along with the request, a second identifier (which may or may not be the same identifier as the first identifier). In response to the content request and second identifier, in particular embodiments, the online application may generate a second derivative identifier by applying the function to the second identifier. In particular embodiments, the online application may provide a content frame and a trusted frame for display on the client device. In particular embodiments, the second derivative identifier may be embedded within the content frame. In particular embodiments, the trusted frame may be able to access the first derivative identifier, but the content frame may be unable to access the first derivative identifier. In particular embodiments, the client device, in accordance with instructions associated with the content frame, may request the trusted frame to verify whether the second derivative identifier matches the first derivative identifier. In particular embodiments, the client device, in accordance with instructions associated with the trusted frame, may verify whether the second derivative identifier matches the stored first derivative identifier. If the two derivative identifiers match, then the client device may display the requested web page in the content frame based on a verification confirmation from the trusted frame that the second derivative identifier matches the stored first derivative identifier.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

An online application may allow third-party content and service providers to provide content and services to people who otherwise would not be able to access their websites. These third-party entities may have websites with web addresses that may be treated as subdomains within the domain of the online application. For example, if a website's normal web address is http://www.domainA.com, and the online application aggregates websites under a main domain referred to as xyz.com, the web address of the third-party website displayed through the online application may be presented as https://inner-http-www-domainA-com.xyz-.com. The web address or host of the third-party website may be used to generate a subdomain of the domain of the online application. In this way, the online application may act as a "portal" to other websites and online services. These websites and online services may be available for free (e.g., without data charges), and include content on subject matter like news, employment, health, education, and local information. As an example and not by way of limitation, the domain of the online application may be xyz.com. In particular embodiments, third-party content provided through the online application may be provided under the domain of the online application (e.g., xyz.com). For example, when accessing a third-party website such as HTTP://WWW.GMAIL.COM through the online application, the URL representing the third-party website may be HTTPS://inner-http-www-gmail-com.xyz.com. The subdomain in this example is "inner-http-www-gmail-com," which is derived from GMAIL's actual address.

When a user visits a website via the online application, the online application may automatically create an identifier for that user. The identifier may be understood to be a userID, an encryption key, or both of these. The identifier may be unique for each user, and may be stored in a cookie on the user's client device (e.g., in a browser on the client device). A client device may be any suitable computing device such as a smartphone, desktop or laptop computer, tablet, wearable device (e.g., smartwatch), or virtual reality headset. The stored cookie may be used in communications between the user device and the online application to identify a session. In particular embodiments, information within the cookie may be associated with a cookie jar on a server of the online application. As the user browses various third-party websites through the online application, associated cookies may be stored in the user's cookie jar on the server.

One security risk with the online application described above is that a hacker may alter the userID and gain access to the user's browsing activities. In particular embodiments, the online application may not be in the public-suffix list. Thus, it may not be able to provide adequate separation between subdomains. Because a third-party page that a user visits through the online application may be presented under the main domain of the online application (e.g., xyz.com), a malicious third-party page may potentially be able to change any cookie associated with the domain of the online application, including cookies associated with subdomains of the domain. This problem does not typically exist because a client browser generally only allows webpages to change cookies that are associated with the domain of that webpage, which means a malicious third-party web page may only change the cookies associated with its own domain. As an example and not by way of limitation, a malicious web page hosted on malicious.com may be able to set and change cookies that are associated with malicious.com, but not cookies for any other domain. But if the user is accessing malicious.com through the online application xyz.com, the URL for the malicious web page may appear as HTTPS:// inner-http-www-malicious-com.xyz.com. In this scenario, a client browser may allow a webpage hosted on malcoius.com, which now belongs to a subdomain of xyz.com, to perform domain lowering and gain control of domain-level cookies. This may be achieved through a JavaScript code block or by any other suitable mechanism. This is because browsers generally allow domain administrators to change subdomains to less-specific versions of the current domain. Because xyz.com is a less-specific version of malicious-com.xyz.com, a browser may allow such a change to occur. Thus, it is conceivable that an attacker, through client-side scripting hosted on malicious.com, may replace the user's userID in the stored cookie with the attacker's own ID, which may have been obtained from xyz.com as well. The attacker's ID may then be unknowingly used by the user in subsequent communications with the online application, which means that the user's browsing activities may be accessible to the attacker. For example, if the user, subsequent to being hacked, visits domainB.com through the online application, any cookie associated with that communication may be stored in the cookie jar associated with the attacker's ID. Thus, the attacker may use his own ID to communicate with the online application and use the cookies stored in the cookie jar, including the user's cookie for domainB.com, and view any private information that the user may access on domainB-com.xyz.com. For example, if domainB-com.xyz.com contains the user's email account, the attacker may be able to view messages in the account. This may put many users at risk.

A user's cookies that are associated with third-party entities are stored on a server associated with the online application. Most cookies are not sent to the client device. Additionally, most user communication through the online application (e.g., if a user communicates with another entity associated with a third party website) is tied to the first identifier that is stored in a cookie on the client device. This may allow an attacker to execute code (e.g., in JavaScript) that may affect the client-side cookies. For example, an attacker may obtain an identifier (e.g., the attacker's own userID) associated with a user from the online application. The attacker may set up a website that may cause the attacker's identifier to be stored on a visiting user's client device. If this user accesses the attacker's website via the online application, the attacker may replace this user's identifier with the attacker's identifier, as discussed above. Thereafter, the user may visit third-party websites such as a web-based email service or online bank accounts, but the user may be visiting these websites with the attacker's identifier instead of the user's own identifier. These third-party websites may store cookies on the server of the online application in a "cookie jar" associated with the user, but the server would associate the cookies with the attacker's identifier. The attacker may be able to access cookies that have been generated by third-party sites while the user is unknowingly using the attacker's identifier. This may allow the attacker to use the attacker's identifier to access the cookie jar, which contains cookies associated with the user's browsing activities, that is stored on a server associated with the online application. In particular embodiments, the cookie jar may be divided into two parts: the identifier and an encryption key associated with the identifier. The identifier may identify the appropriate cookie jar for a given user. By changing the user's identifier to the attacker's identifier, the attacker may cause the server to unknowingly use the attacker's cookie jar even though it is the user who is browsing. Since the user's cookies with third-party sites are stored in the attacker's cookie jar, the attacker may communicate with the online application using his own ID and access the user's accounts associated with those cookies.

To protect users from attackers, when a user initially uses the online application to access third-party content, in particular embodiments, a client device may send a login request to a server computing device associated with the online application. In response to the request, the online application may generate a first identifier and a first derivative identifier. In particular embodiments, the first derivative identifier may be generated by applying a function to the first identifier. In particular embodiments, the online application may associate the user with the first identifier and the first derivative identifier. In particular embodiments, the online application may send the first identifier and the first derivative identifier to the client device of the user for storage. In particular embodiments, the client device may store the first derivative identifier in local storage. The first identifier may be stored as a cookie. When the user sends a content request to the online application (which may or may not be at the time of initial login), in particular embodiments, the user's client device may send, along with the request, a second identifier (which may or may not be the same identifier as the first identifier). In response to the content request and second identifier, in particular embodiments, the online application may generate a second derivative identifier by applying the function to the second identifier. In particular embodiments, the online application may provide a content frame and a trusted frame for display on the client device. In particular embodiments, the second derivative identifier may be embedded within the content frame. In particular embodiments, the trusted frame may be able to access the first derivative identifier, but the content frame may be unable to access the first derivative identifier. In particular embodiments, the client device, in accordance with instructions associated with the content frame, may request the trusted frame to verify whether the second derivative identifier matches the first derivative identifier. In particular embodiments, the client device, in accordance with instructions associated with the trusted frame, may verify whether the second derivative identifier matches the stored first derivative identifier. If the two derivative identifiers match, then the client device may display the requested web page in the content frame based on a verification confirmation from the trusted frame that the second derivative identifier matches the stored first derivative identifier.

In particular embodiments, a client device of a user may send a login request to the online application. The login request may simply be a request to access the online application. As an example and not by way of limitation, the online application may be associated with the domain xyz.com. A user may use a browser on the client device to navigate to xyz.com. In particular embodiments, this navigation may be the login request. In particular embodiments, the login request may comprise a request to access a third-party website via the online application. As an example and not by way of limitation, a user may open a browser and enter domainA.com into the online application's URL bar. A server of the online application may then retrieve the requested content (e.g. domainA.com) and present the content to the user from, e.g., a subdomain of the domain of the online application. For example, the content of domainA.com may be provided from domainA-com.xyz.com. Although this disclosure describes receiving a login request in a particular manner, this disclosure contemplates receiving a login request in any suitable manner.

In particular embodiments, the online application may generate a first identifier for the user. It may be understood that generating a first identifier for the user means to generate a first identifier for the client device of the first user. The identifier may be any suitable identifier that identifies the user's session with the online application. In particular embodiments, the online application may also generate a first derivative identifier by applying a function (e.g., hash function) to the first identifier. In particular embodiments, the function may be a one-way function. The one-way function may make it extremely difficult to recover the original identifier from the derivative identifier. This may keep the original identifier secure. In particular embodiments, the online application may also associate the user with the first identifier and the first derivative identifier by associating a cookie jar with the first identifier. Although this disclosure describes generating a first identifier and first derivative identifier in a particular manner, this disclosure contemplates generating a first identifier and first derivative identifier in any suitable manner.

Figure 1:
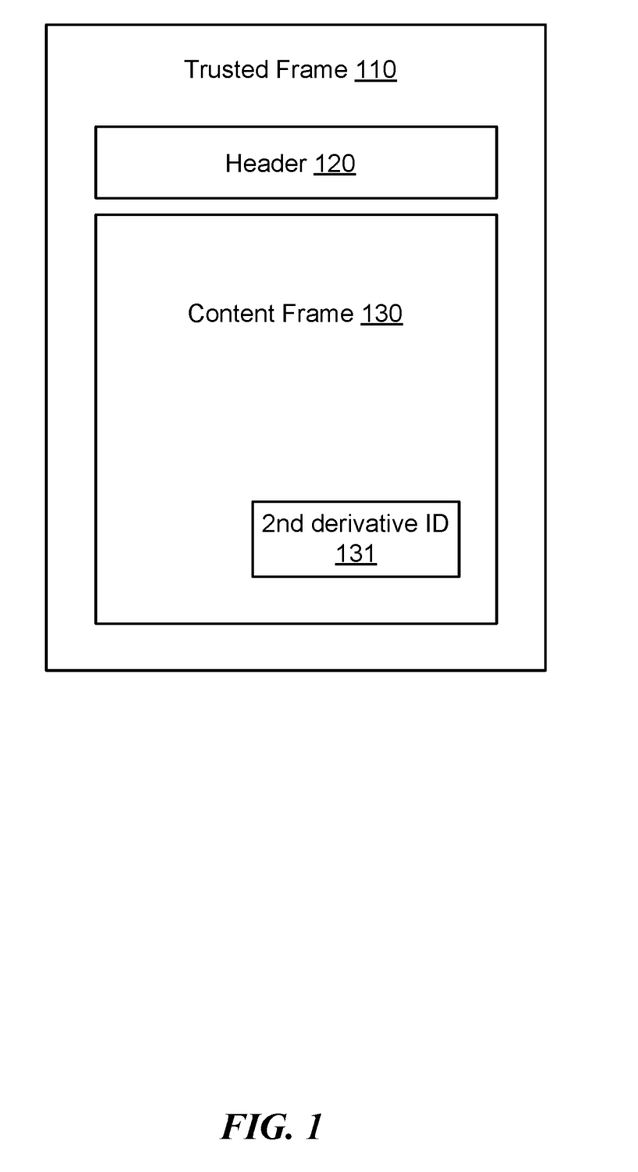
FIG. 1 illustrates an example content frame and trusted frame.

In particular embodiments, the online application may send the first identifier and the first derivative identifier to the user's client device for storage. For example, the user's client device may store the first identifier and first derivative identifier in storage locations associated with the browser through which the user is accessing the online application. In particular embodiments, the online application may present requested content in a web page comprising a trusted frame (e.g., a wrapper or outer frame) and a content frame (e.g., an inline or inner frame of the trusted frame). In particular embodiments, the first identifier may be stored in a location that is accessible to the content frame. For example, the first identifier may be stored as a cookie. In particular embodiments, the first derived identifier may be stored in a location that is accessible to the trusted frame but not accessible to the content frame. For example, the first derived identifier may be stored as a value associated with an origin of the trusted frame. For instance, the trusted frame may present content from a trusted subdomain of the online application, such as trusted.xyz.com. In this example, the first derived identifier may be stored as a value tied to the origin trusted.xyz.com. Even if the user visits a malicious website (e.g., malicious.com) through the online application, the content of malicious.com would be provided under the subdomain malicious-com.xyz.com, which is a different origin from trusted.xyz.com. This means that any malicious page provided from malicious-com.xyz.com would not be able to access the first derived identifier stored and associated with the trusted.xyz.com origin. In particular embodiments, the trusted frame 110 may be associated with a first origin and the content frame 130 may be associated with a second origin that is different from the first origin, and the first origin and the second origin may have the same domain. Although this disclosure describes sending a first identifier and the first derivative identifier to a client device for storage in a particular manner, this disclosure contemplates sending a first identifier and the first derivative identifier to a client device for storage in any suitable manner.

In particular embodiments, the user's client device may send a content request to the online application. The content request may be for a web page and may comprise a second identifier. In particular embodiments, the second identifier may be a copy of the identifier stored in the cookie. Thus, the second identifier may be the same as the first identifier in the normal scenario where no hacking has occurred (i.e., the first identifier that was originally stored has not been altered). However, the second identifier may be different from the first identifier if an attacker has altered or swapped the originally first identifier stored on the user's client device. As an example and not by way of limitation, an attacker may have obtained an attacker's identifier from the online application through a regular login flow and setup a website that, when visited by a user through the online application, may cause the attacker's identifier to be stored on the visiting user's client device. If the user accesses the attacker's website via the online application, the attacker may replace the user's identifier with the attacker's identifier. If this identifier-swapping has occurred, when the user sends a content request for a web page to the online application, the user's client device may send a second identifier along with the content request. This second identifier may be the attacker's identifier and not the user's identifier. Although this disclosure describes receiving a content request from the client device for a web page in a particular manner, this disclosure contemplates receiving a content request from the client device for a web page in any suitable manner.

In particular embodiments, in response to the content request, the online application may generate a second derivative identifier by applying the function discussed above to the second identifier. As discussed, the function may, in particular embodiments, be a one-way function. The one-way function may make it extremely difficult to recover the original identifier from the derivative identifier. In particular embodiments, if the second identifier is the same as the first identifier (the normal scenario where no hacking has occurred and thus no security breach has occurred), then the second derivative identifier and the first identifier would match. On the other hand, if the second identifier and the first identifier are different (e.g., hacking has occurred and thus a security breach has occurred), then there would be a mismatch between the corresponding second derivative identifier and the first derivative identifier. If the first derivative identifier and the second derivative identifier are the same (e.g., they match), then the user has not been hacked, no security breach has occurred, and the user may be safe to view the requested content. If the first derivative identifier and the second derivative identifier are different (e.g., a mismatch), the user may have been hacked and a security breach may have occurred. In particular embodiments, the online application does not make this determination; rather, the comparison between the first derivative identifier and the second derivative identifier is made by a trusted frame on the client side, as discussed below. Although this disclosure describes generating a second derivative identifier in a particular manner, this disclosure contemplates generating a second derivative identifier in any suitable manner.

In particular embodiments, the online application may provide a content frame and a trusted frame for display on the client device. In particular embodiments, the online application may embed the second derivative identifier in the content frame. FIG. 1 illustrates an example content frame 130, trusted frame 110, and header 120. The header 120 is the location where the name of the inner page is normally displayed. The content frame 130 may display content from a third-party entity. As an example and not by way of limitation, if the third-party entity is BUZZFEED, the content displayed in the content frame 130 may be an article titled "21 Previously Ignored Paris Hilton Photos from the '00s." The content frame 130 may additionally comprise the second derivative identifier 131. For example, the content frame 130 may be aware of the second derivative identifier 131 (e.g., as an embedded element or value), but the identifier 131 is not displayed to the user. The trusted frame 110 may be associated with a trusted origin. In particular embodiments, the trusted origin may be a trusted subdomain of the online application (e.g., trusted.xyz.com). In particular embodiments, the inner frame and the trusted frame may be separate. The information stored in the trusted frame or in association with the trusted origin may be inaccessible to the content frame 130 or the third-party entity associated with the content frame 130. For example, the content frame may have a different host (e.g., malicious-com.xyz.com) than the host of the trusted frame (e.g., trusted.xyz.com). The web page loaded in the content frame or the entity associated with the web page loaded in the content frame may be unable to access content stored in the trusted origin or the trusted frame due to the same-origin policy that browsers typically adhere to. In particular embodiments, the first identifier may be stored as a cookie on the client device. The first derivative identifier may be stored in a location accessible by the trusted frame and not accessible by the content frame. For example, this location may be a value associated with the trusted origin. In particular embodiments, the trusted frame and the content frame may be separated such that an entity associated with the content frame may be unable to lower its host address to the main domain associated with the online application. As an example and not by way of limitation, if the main domain for the online application is xyz.com, a third-party entity with the address of malicious-com.xyz.com may be unable to lower a domain to this main application to gain access to the stored first derivative identifier. The lowest the third-party entity may be able to lower a domain is, for example, malicious.com-xyz.com. Although this disclosure describes providing a content frame and a trusted frame in a particular manner, this disclosure contemplates providing a content frame and a trusted frame in any suitable manner.

In particular embodiments, the content frame 130 may be associated with instructions to request the trusted frame to verify whether the second derivative identifier 131 matches the first derivative identifier. The client device may request the trusted frame according to the instructions. As an example and not by way of limitation, the content frame 130 may send its second derivative identifier to the trusted frame 110 using a parent.postMessage( ) command. In particular embodiments, the trusted frame 110 may be associated with instructions to access the first derivative identifier, which may be stored as a value associated with the trusted origin. The trusted frame 110 may also be associated with instructions to check the first derivative identifier against the second derivative identifier 131 received from the content frame. If the two derivative identifiers match, the trusted frame 110 may send a verification confirmation to the content frame 130 (e.g., via a postMessage command( )). The trusted frame 110 may also send a verification confirmation to the browser. In response to the verification confirmation, the content frame 130 may display the content requested by the user. In particular embodiments, while this confirmation is occurring, the client device may withhold displaying any content from the third-party web site on the display screen of the client device. Although this disclosure describes communication between frames in a particular manner, this disclosure contemplates communication between frames in any suitable manner.

In particular embodiments, if the second derivative identifier and the first derivative identifier do not match, one or more remedies may be performed. These remedies may include, e.g., the trusted frame or content frame may be configured to terminate a current session of the client device of the user, the user may be assigned a new first identifier, or one or more of the user's cookies may be deleted or cleared. One or more, but not necessarily all, of these remedies may be performed if the derivative identifiers do not match. In particular embodiments, these actions may also be performed with respect to the attacker's identifier. The remedies may result in the user being redirected to a main page associated with the online application, where a new identifier may be created for the user's session. This may be because a mismatch between the two derivative identifiers may signify that an attacker has swapped the attacker's identifier for the user's first identifier. Thus, the second identifier may be the attacker's identifier. If this occurs, the user's account is not secure, and the session may be terminated in order to preserve the user's security and private data. In particular embodiments, another remedy may include one or more cookies associated with the user being deleted or cleared from the client device of the user and/or from the cookie jar associated with the user's identifier on the server associated with the online application. As an example and not by way of limitation, if the two derivative identifiers do not match, and the user has cookies associated with third-party entities stored in the user's cookie jar on a server, the online application may delete these cookies from the cookie jar. In particular embodiments, the online application may only delete the cookies that were stored after the user's identifier was swapped for another identifier. Although this disclosure describes terminating a current session in a particular manner, this disclosure contemplates terminating a current session in any suitable manner.

In particular embodiments, the content frame 130 may be an inline frame of the trusted frame 110, as illustrated in FIG. 1. This need not be the only arrangement of the trusted frame 110 and the content frame 130. As an example and not by way of limitation, the trusted frame 110 may be display within the content frame 130. As another example and not by way of limitation, the trusted frame 110 may be hidden from view. Although this disclosure describes a particular arrangement for a content frame and a trusted frame, this disclosure contemplates any suitable arrangement for a content frame and a trusted frame.

In particular embodiments, the content frame may be presented to the user without a trusted frame, which may occur due to an attack or user error. In particular embodiments, if this occurs, no trusted frame is present to perform the check to determine if the two derivative identifiers are the same or not. In this scenario, the content frame 130 may send a request to the non-existent trusted frame, but it would not receive any acknowledgement in return. The content frame 130 may be configured to timeout if it does not receive an acknowledgement within a threshold amount of time. If a timeout occurs, the content frame 130 may not display any content and the current session for the user may be terminated, one or more of the user's cookies may be deleted, and the user may be assigned a new identifier, as discussed above. One or more, or none, of these results may occur, according to the suitable procedure fore the content frame 130 and online application to follow. Although this disclosure describes issuing a timeout for a content frame request in a particular manner, this disclosure contemplates issuing a timeout for a content frame request in any suitable manner.

In particular embodiments, the content frame 130 or client device may perform a secondary check even after the trusted frame 110 has sent the verification confirmation. This may be because an attacker may "impersonate" the trusted frame 110 and send a counterfeit verification confirmation. In particular embodiments, the secondary check may be to determine if the sender is a known sender (e.g., the trusted origin). If the sender is unknown, this may indicate that the sender of the verification confirmation is an attacker and the user has been hacked. If this occurs, the remedies discussed above may be performed. Although this disclosure describes performing a secondary check in a particular manner, this disclosure contemplates performing a secondary check in any suitable manner.

In particular embodiments, an attacker may swap the user's identifier after a verification confirmation is sent by the trusted frame 110 and a corresponding form (e.g., login form for an email account) has been displayed, but before the user has submitted authentication information through the form (e.g., email username and password). Such an attack may result in the user submitting his/her authentication information under the attacker's identifier. To prevent an attacker from compromising a user's data in this manner, in particular embodiments the online application may track the identifiers/cookies used when getting a form and posting through the form. For example, when the user requested a login page to his email, the server of the online application may store the identifier used in the request and then compare it to the identifier used when data is submitted through the form. If a match is found, then the submission may proceed normally. However, if a mismatch is found, then the server may interrupt the data submission and perform any of the remedies discussed above since the user's session may have been compromised. In another embodiment, the verification process may occur on the client side. For example, the content frame 130, upon detecting a data submission request, may first request the online application to provide a derivative identifier for the current identifier (which may be the user's or may be an attacker's). The content frame 130 may be configured to re-request the trusted frame 110 to perform the verification described above when the server returns the derivative identifier. If a match is found, then the content frame 130 may proceed with submitting the form using the verified identifier; otherwise, it may perform any of the remedies discussed above. This may ensure that even after the trusted frame 110 has sent an initial verification confirmation, an attacker cannot swap out the user's identifier for the attacker's identifier. Although this disclosure describes performing multiple verifications of derivative identifiers in a particular manner, this disclosure contemplates performing multiple verifications of derivative identifiers in any suitable manner.

In particular embodiments, the content frame 130 or the trusted frame 110 may be configured to detect or prevent "clickjacking." The content frame 130 may be configured to verify whether its associated frame hierarchy is correct. As an example and not by way of limitation, if the content frame 130 is the second level in the frame hierarchy, the content frame 130 may be configured to verify that its parent frame is the top frame (e.g., the top-most frame). As another example and not by way of limitation, if the expected location of the content frame 130 is in the third level of the frame hierarchy, it may be configured to determine that its parent frame is in the second level of the frame hierarchy. In particular embodiments, the trusted frame 110 may be configured to be the top frame, so the content frame 130 may check to verify whether the top-most frame is the trusted frame 110. In particular embodiments, the trusted frame 110 may check whether it is the top frame. In particular embodiments, the trusted frame may be configured to prevent itself from being displayed in another frame, such as by using the HTML command: add header X-Frame-Options DENY. Although this disclosure describes detecting clickjacking in a particular manner, this disclosure contemplates detecting clickjacking in any suitable manner.

In particular embodiments, the online application or the client device may take steps to prevent or detect phishing attempts from malicious third-party websites. In particular embodiments, the online application may create subdomain names in such a way to let users know if they have unknowingly accessed a malicious site that looks like a legitimate site. In particular embodiments, this may be accomplished by including the inner origin in the host part of the URL, such as by using the inner origin to generate the subdomain name (e.g., malicious-com.xyz.com). This may allow browsers or users to detect whether they have unknowingly accessed a look-a-like site. In particular embodiments, the online application may put the inner origin (e.g., malicious.com) in a header frame 120. This would cause the trusted frame 110 to display the domain of the online application (e.g., xyz.com) and the header frame 120 may display the domain of the third-party site (e.g., malicious.com). Although this disclosure describes detecting phishing attempts in a particular manner, this disclosure contemplates detecting phishing attempts in any suitable manner.

Figure 2:
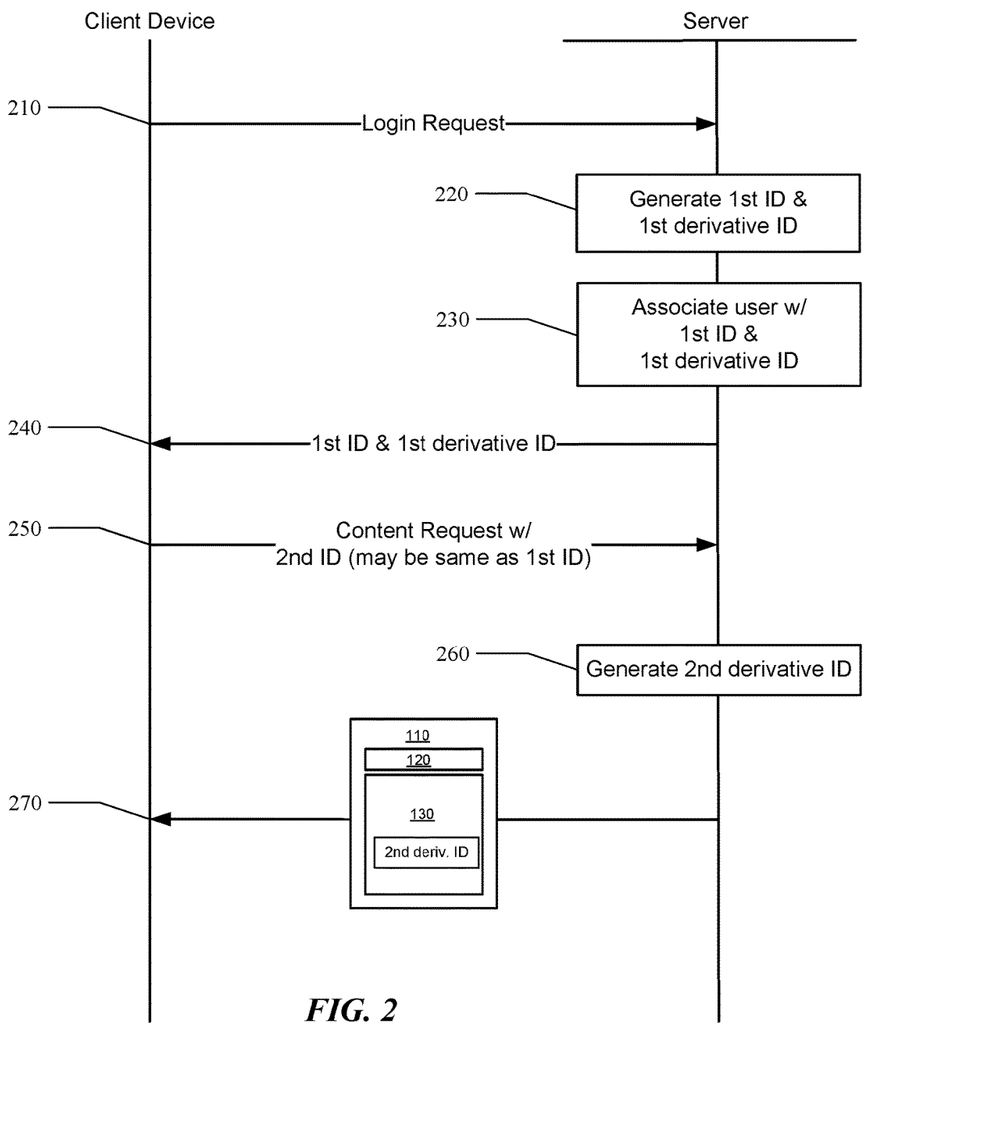
FIG. 2 illustrates an example interaction diagram for securely delivering content over a domain portal.

FIG. 2 illustrates an example interaction diagram for securely delivering content over a domain portal. The method may begin at step 210, where a server associated with the online application may receive a login request from a client device of a user. At step 220, the online application may generate a first identifier and a first derivative identifier. The first derivative identifier may be generated by applying a function to the first identifier. At step 230, the online application may associate the user with the first identifier and the first derivative identifier. At step 240, the online application may send the first identifier and the first derivative identifier to the client device of the user for storage. At step 250, the user may send a content request to the online application (which may or may not be at the time of initial login) which may include a second identifier. At step 260, in response to the content request and second identifier, the online application may generate a second derivative identifier by applying the function to the second identifier. At step 270, the online application may provide a content frame and a trusted frame for display on the client device. The second derivative identifier may be embedded within the content frame. The trusted frame may be able to access the first derivative identifier, but the content frame may be unable to access the first derivative identifier. The content frame may be configured to request the trusted frame to verify whether the second derivative identifier matches the first derivative identifier. The content frame may also be configured to display the requested content (e.g., web page) upon receiving a verification confirmation from the trusted frame. The trusted frame may be configured to access the first derivative identifier and verify that the second derivative identifier matches the first derivative identifier. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for securely delivering content over a domain portal including the particular steps of the method of FIG. 2, this disclosure contemplates any suitable method for securely delivering content over a domain portal including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
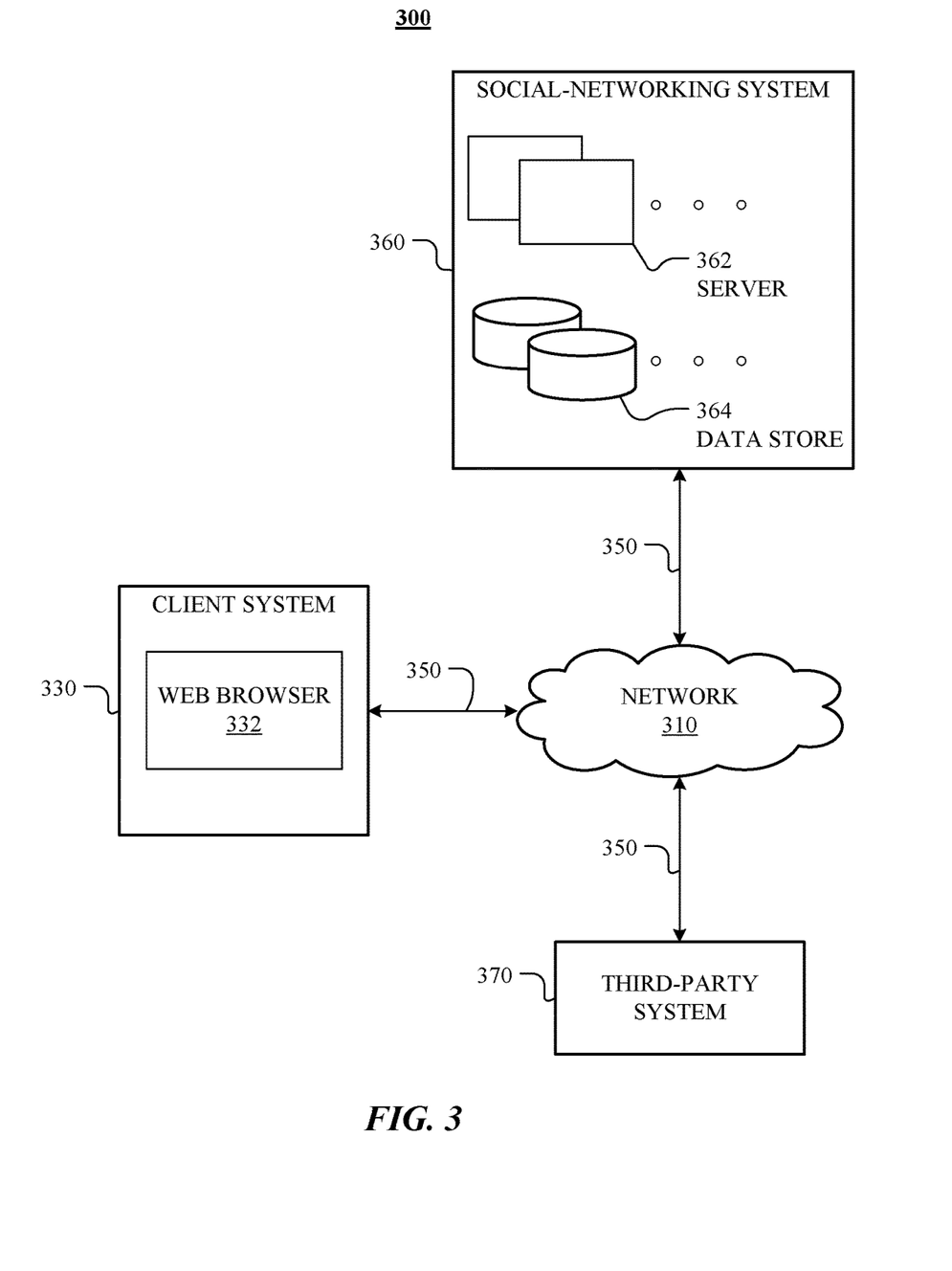
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 360 or shared with other systems (e.g., third-party system 370). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 370, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 362 may be authorization/privacy servers for enforcing privacy settings. In response to a request from a user (or other entity) for a particular object stored in a data store 364, social-networking system 360 may send a request to the data store 364 for the object. The request may identify the user associated with the request and may only be sent to the user (or a client system 330 of the user) if the authorization server determines that the user is authorized to access the object based on the privacy settings associated with the object. If the requesting user is not authorized to access the object, the authorization server may prevent the requested object from being retrieved from the data store 364, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 4:
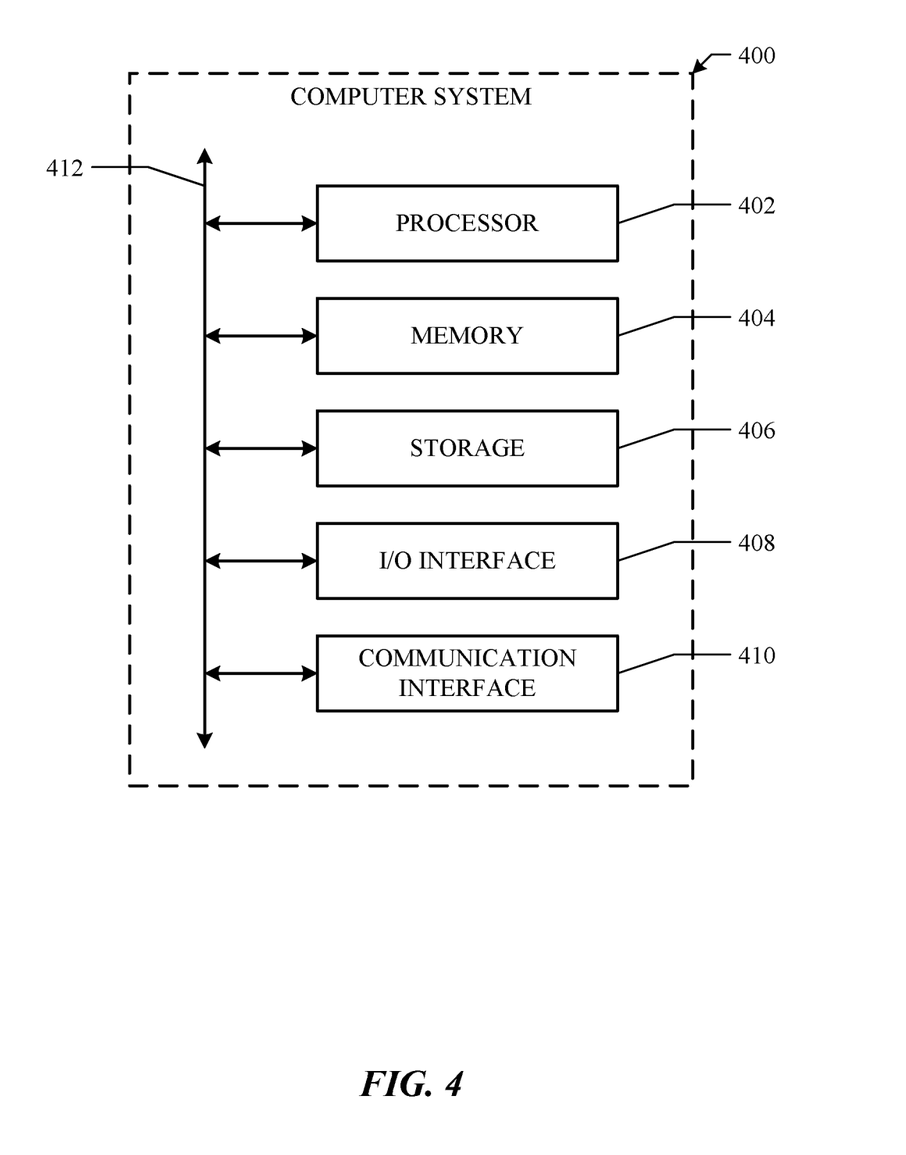
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a client device of a user, sending a login request to a server computing device;
   by the client device, receiving a first derivative identifier from the server computing device;
   by the client device, storing the first derivative identifier;
   by the client device, sending a content request to the server computing device for a web page;
   by the client device, receiving, from the server computing device, a content frame and a trusted frame for display on the client device, wherein the content frame comprises a second derivative identifier;
   by the client device and according to instructions associated with the content frame, requesting the trusted frame to verify whether the second derivative identifier matches the first derivative identifier;
   by the client device and according to instructions associated with the trusted frame, verifying whether the second derivative identifier matches the stored first derivative identifier; and
   by the client device, displaying the requested web page in the content frame based on a verification confirmation from the trusted frame that the second derivative identifier matches the stored first derivative identifier.

2. The method of claim 1, wherein the first derivative identifier is stored in a location accessible by the trusted frame and not accessible by the content frame.

3. The method of claim 1, further comprising:
   by the client device, receiving from the server computing device a first identifier associated with the first derivative identifier; and
   by the client device, storing the first identifier in a location accessible by the content frame;
   wherein the content request includes a second identifier associated with the second derivative identifier.

4. The method of claim 3,
   wherein the first derivative identifier is generated by applying a function to the first identifier; and
   wherein the second derivative identifier is generated by applying the function to the second identifier.

5. The method of claim 1, wherein a match between the first derivative identifier and the second derivative identifier indicates that no security breach has occurred.

6. The method of claim 1, wherein a mismatch between the first derivative identifier and the second derivative identifier indicates that a security breach has occurred.

7. The method of claim 1, further comprising:
   by the client device, terminating a current session associated with the first derivative identifier based on an indication from the trusted frame that the second derivative identifier does not match the stored first derivative identifier.

8. The method of claim 1, further comprising:
   by the client device, requesting a new first derivative identifier for the user based on an indication from the trusted frame that the second derivative identifier does not match the stored first derivative identifier.

9. The method of claim 1, wherein the login request comprises a request to access a third-party website via an online application.

10. The method of claim 1, wherein the content frame is an inline frame of the trusted frame on a display screen associated with the client device of the user.

11. The method of claim 1, further comprising:
    by the client device, deleting one or more cookies that are stored on the client device and associated with the user based on an indication from the trusted frame that the second derivative identifier does not match the stored first derivative identifier.

12. The method of claim 1, wherein the content frame comprises content from a third-party entity.

13. The method of claim 3, wherein the first identifier is stored as a cookie.

14. The method of claim 1, wherein the first derivative identifier is stored as a value associated with an origin of the trusted frame.

15. The method of claim 1,
    wherein the trusted frame is associated with a first origin and the content frame is associated with a second origin different from the first origin; and
    wherein the first origin and the second origin have the same domain.

16. The method of claim 15,
    wherein the requested web page has an associated web address; and
    wherein the second origin is generated using the web address of the requested web page.

17. One or more computer-readable non-transitory storage media embodying software that is operable when executed to:
    send a login request to a server computing device;
    receive a first derivative identifier from the server computing device;
    store the first derivative identifier;
    send a content request to the server computing device for a web page;
    receive, from the server computing device, a content frame and a trusted frame for display on the client device, wherein the content frame comprises a second derivative identifier;
    according to instructions associated with the content frame, request the trusted frame to verify whether the second derivative identifier matches the first derivative identifier;
    according to instructions associated with the trusted frame, verify whether the second derivative identifier matches the stored first derivative identifier; and
    display the requested web page in the content frame based on a verification confirmation from the trusted frame that the second derivative identifier matches the stored first derivative identifier.

18. The media of claim 17, wherein the first derivative identifier is stored in a location accessible by the trusted frame and not accessible by the content frame.

19. A system comprising: one or more processors; and a memory coupled to the processors comprising instructions executable by the processors, the processors being operable when executing the instructions to:
    send a login request to a server computing device;
    receive a first derivative identifier from the server computing device;
    store the first derivative identifier;
    send a content request to the server computing device for a web page;
    receive, from the server computing device, a content frame and a trusted frame for display on the client device, wherein the content frame comprises a second derivative identifier;
    according to instructions associated with the content frame, request the trusted frame to verify whether the second derivative identifier matches the first derivative identifier;

according to instructions associated with the trusted frame, verify whether the second derivative identifier matches the stored first derivative identifier; and display the requested web page in the content frame based on a verification confirmation from the trusted frame that the second derivative identifier matches the stored first derivative identifier.

20. The system of claim 19, wherein the processors are further operable when executing the instruction to:

terminate a current session associated with the first derivative identifier based on an indication from the trusted frame that the second derivative identifier does not match the stored first derivative identifier.

* * * * *